United States Patent [19]

Higgins et al.

[11] 4,004,540

[45] Jan. 25, 1977

[54] GALVANIC DETECTOR FOR DETECTING THE CUTTING OF A COMMAND WIRE

[75] Inventors: Francis J. Higgins, Panama City, Fla.; Charles T. McGraw, Atlanta, Ga.; Edward L. Sanderson, Panama City, Fla.

[73] Assignee: The United States of America as represented by the Secretary of the Navy, Washington, D.C.

[22] Filed: Jan. 10, 1968

[21] Appl. No.: 698,097

[52] U.S. Cl. .............................. 114/244; 340/4 E; 114/221 A
[51] Int. Cl.² ...................... G01V 3/02; G01V 9/00
[58] Field of Search .......... 114/237; 340/4; 324/52

[56] References Cited

UNITED STATES PATENTS

| | | |
|---|---|---|
| 2,907,949 | 10/1959 | Rogers et al. ........................ 324/52 |
| 3,214,728 | 10/1965 | Higgins ................................... 340/4 |
| 3,265,972 | 8/1966 | Curry ................................... 325/28 |
| 3,267,418 | 8/1966 | Wolfe ..................................... 340/4 |
| 3,273,110 | 9/1966 | Monroe et al. ......................... 340/4 |

Primary Examiner—Samuel W. Engle
Assistant Examiner—Thomas H. Webb
Attorney, Agent, or Firm—Louis A. Miller; Don D. Doty; William T. Skeer

[57] ABSTRACT

An apparatus and method for detecting the presence of, and severing command cables submerged in an aqueous medium, utilizing a galvanic current pulse generated by a galvanic cell with one electrode thereof serving as a cable cutter.

10 Claims, 9 Drawing Figures

FRANCIS J. HIGGINS
CHARLES T. McGRAW
EDWARD L. SANDERSON
INVENTORS

FRANCIS J. HIGGINS
CHARLES T. McGRAW
EDWARD L. SANDERSON
INVENTORS

FRANCIS J. HIGGINS
CHARLES T. McGRAW
EDWARD L. SANDERSON
INVENTORS

GALVANIC DETECTOR FOR DETECTING THE CUTTING OF A COMMAND WIRE

The invention described herein may be manufactured and used by or for the Government of the United States of America for governmental purposes without the payment of any royalties thereon or therefor.

This invention relates generally to the detection of the presence of electrical conductors submerged in an aqueous medium when said electrical conductors are severed by a cutting tool towed in said aqueous medium by a suitable tractor vehicle. More particularly, this invention relates to the detection of control cables of remotely actuated mines when said control cables are severed in a minesweeping operation.

A frequently encountered threat to friendly shipping in the rivers and harbors of occupied territory is a type of marine mine, known as a river mine, which is moored in position and detonated from shore via a command cable. The command cable may be any type of light gauge insulated conductors. One frequently encountered type is an older type of telephone wire which is covered with a coating of lead. An effective countermeasure for this type mine has consisted of dragging a cutter on the bottom in shallow water along the shoreline to sever the command cables.

The location of the river mine or mine field is, in many instances, more difficult than the countermeasure sweeping operation above noted. The location of individual mines and mine fields is, as can be appreciated, desirable for the purposes of detection, surveillance, and countermeasure of the espionage agents engaged in the mining operation, as well as for sweeping countermeasures to neutralize the mine. The location, by conventional methods, of the mine is hampered by sediment-caused poor visibility, metallic debris, and high acoustic noise levels in the river and harbor waterway.

Accordingly, it is an object of this invention to provide an improved minesweeping method and apparatus which is effective to sever the command cable of a river mine, as well as to provide an indication of the presence of electrical conductors so severed.

More particularly, it is an object of this invention to provide an improved cutter for submerged control cables of river mines which will, in addition to cutting the cables, provide an electrical output pulse corresponding to the impact of the cutter and the control cable.

An additional object of this invention is the provision of a wire detecting-cutting method and apparatus for wires submerged in an aqueous medium employing a galvanic current pulse generated by one electrode of a galvanic cell contacting and severing the submerged wires.

Other objects and many of the attendant advantages will be readily appreciated as the subject invention becomes better understood by reference to the following detailed description, when considered in conjunction with the accompanying drawings wherein.

Figure 1:
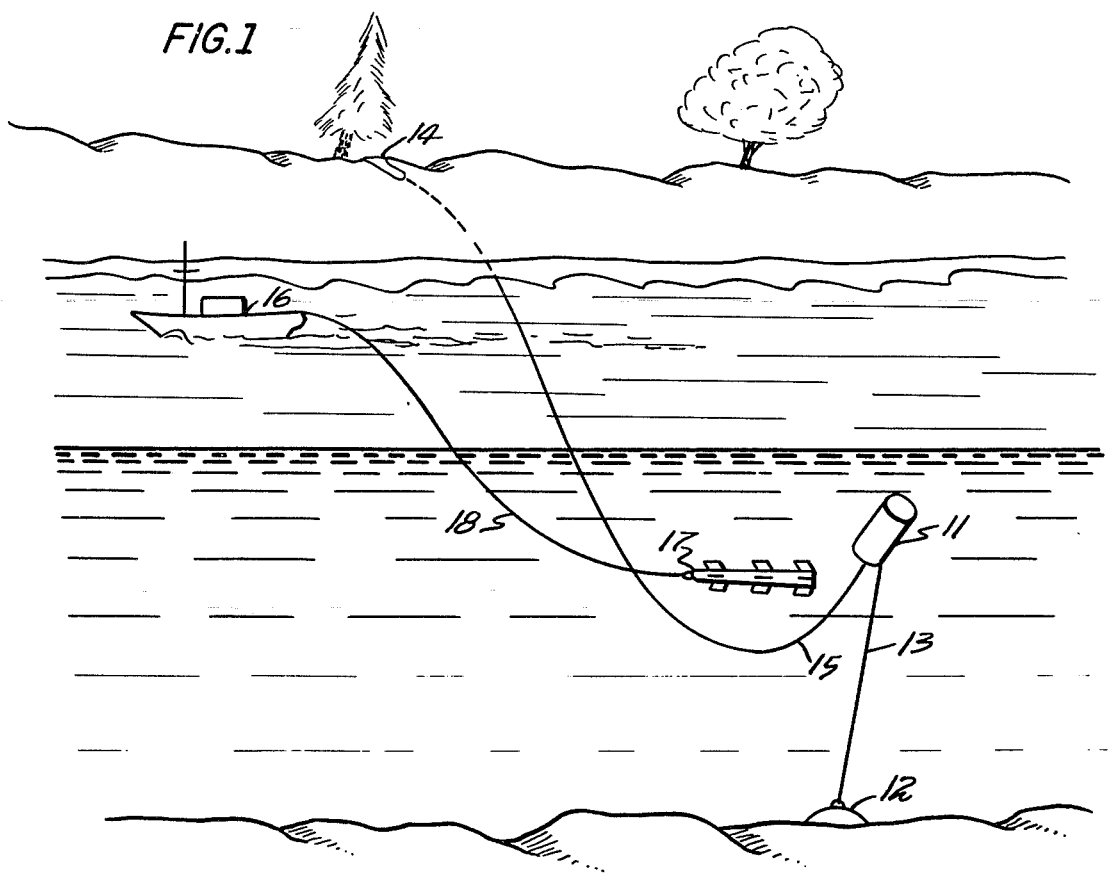
FIG. 1 is an illustration of the environment of a river mine installation showing the cutter in use.

Referring now to FIG. 1, a river mine 11, which may be an oil drum filled with explosives, is joined to an anchoring weight 12 by means of a suitable line 13. Mine 11, thus moored, is connected to a shore control point 14 by means of an electrical command cable 15. A surface vessel 16 tows a cutter assembly 17 by means of a suitably attached tow line 18. Tow line 18 also supports or encloses suitable electrical conductors which connect the blades and reference electrodes of cutter assembly 17 to appropriate circuitry in the surface vessel 16, as will be herein described.

Tow line 18 may be a suitable length of shielded electrical conductor cable. In such instances the shielding may be made of wire rope such that it may serve to take most of the tension of towing as well as providing a connection to the electrode structure of the cutting assembly. If towing of other equipment is contemplated or if conditions make heavy fouling likely, an additional towing line of a suitable gauge of metal cable may be employed with the electrical conductor cable carried therewith.

Although the cutter is shown as being towed by a surface vessel 16, it may be moved by any type of watercraft; aircraft, either fixed or rotary wing; air cushion vehicle; or land vehicle, as desired. Similarly, the cutter assembly may take other forms than the cylinder with protruding cutting blades depicted, for purposes of illustration, in FIG. 1.

When a cutter blade and a reference electrode made of the same metal are immersed in an aqueous medium and connected in electrical circuit, an electric galvanic cell is formed. Due to the similarity of metals used for the blade and reference electrode only a very small potential exists between them. However, when the blade is driven, as in the case of impact occasioned by towing, through the insulation layer of a river mine command cable, a voltage pulse results as the blade contacts and severs the electrical conductor of the cable. This pulse, due to the galvanic cell action with the conductor serving as a cell electrode, is detected by suitable electronic circuitry and is used, after suitable processing, to indicate the presence of the conductor contact or, in the parlance of minesweeping, a "strike". The pulse additionally may be used to sound an alarm, trigger a countermeasure device or circuit, operate a recorder, or actuate other devices or circuits as deemed desirable by the operating personnel.

Figure 2:
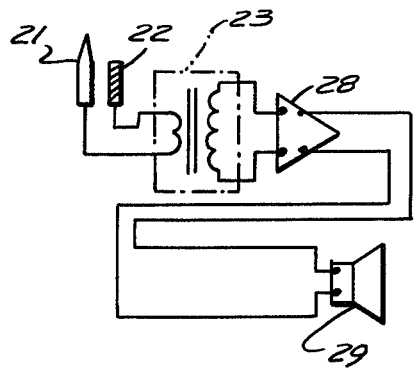

One preferred circuit arrangement, particularly adaptable in the aforedescribed operational environment, is diagrammatically shown in FIG. 2. A cutter blade 21 and a similar metal electrode 22 are connected to the input of a suitable coupling circuit 23. Coupling circuit 23 may be, as circumstances merit, either an amplifier or simply an impedance matching transformer, as shown. The galvanic current pulse generated when the cutter 21 contacts a submerged wire is passed from said coupling circuit 23 to an amplifier 28. Amplifier 28 increases the power of the pulse sufficiently to operate a suitable utilization device 29.

Figure 3:
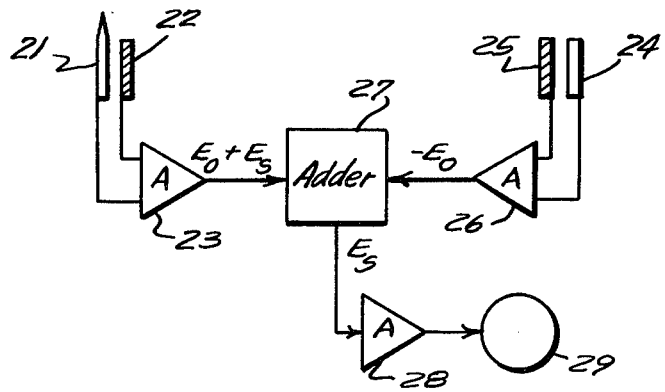
FIGS. 2 through 4 illustrate diagrammatically systems including circuit arrangements suitable for use in the invention.

While theoretically there would be no output from a galvanic cell wherein the two electrodes are of the same material, in fact, experience has shown that a small voltage does exist, even when the two electrodes are made from the same piece of stock. Inasmuch as this small ever-generated voltage varies as the cell is towed, the signal-to-noise ratio of the towed system may be improved by comparing the output of the cell formed by cutter blade 21 and electrode 22 with a similar cell comprising electrodes 24 and 25 but connected through coupling circuit 26 in such a fashion that the output is of the opposite polarity, as shown in FIG. 3. The output from coupling circuits 23 and 26 are combined in a conventional adder circuit 27. In the adder circuit 27, the noise, or no-signal, voltages $E_o$ are cancelled due to the polarity difference, while the signal pulse $E_s$, corresponding to a strike by cutter blade 21, is passed to amplifier 28 where it is amplified to an operating level of the utilization device 29. It should be recognized that such a comparison may be omitted if desired and the pulse from a strike amplified and detected by other conventional circuitry. The artisan skilled in mine detection and countermeasure techniques may, without departingfrom the scope of the herein disclosed invention, employ any one of several known utilization devices, indicated schematically at 29. Such devices include indicators, counters, recorders, alarms, and countermeasure circuits, which, since they form no essential part of the present sweep-detection device, are not described in further detail. Conventional cathode ray indicators and audio alarms are, in particular, useful in the preferred embodiment.

The enhancement of the signal-to-noise ratio is particularly desirable for fresh water applications. In fresh water environments, the voltage generated is small. For example, the galvanic potential difference between the stainless steel and lead is only 0.02 volts. This value agrees generally with the observations of LaQue and Cox published in a copyrighted report "Some Observations of the Potentials of Metals and Alloys in Sea Water"; Proceedings of the American Society for Testing Metal; Philadelphia, Pa.; Volume 40, 1940. This small value is of the same order of magnitude as the noise generally encountered.

Figure 4:
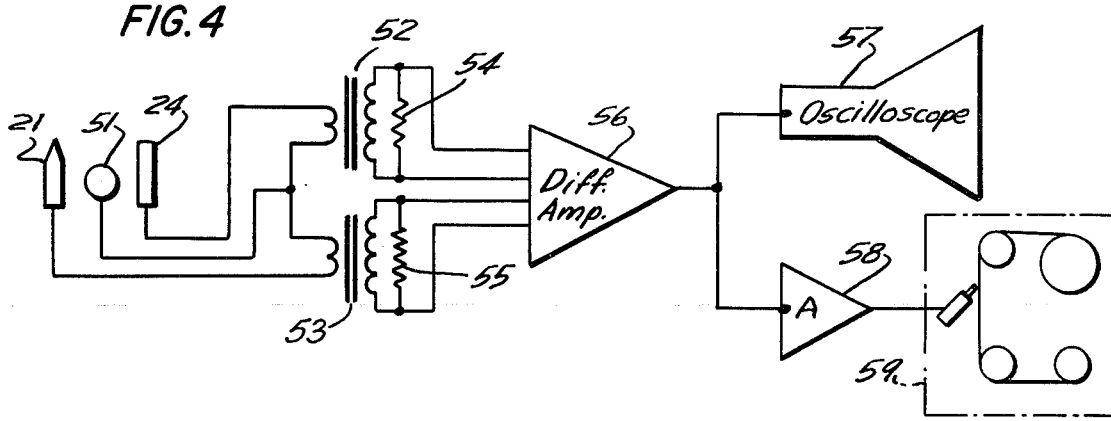

A system and circuit arrangement suitable for this fresh water environment is shown in FIG. 4. In this embodiment the reference electrodes of each cell are combined to form a single reference electrode 51. Each of the two active electrodes 21 and 24 cooperate with electrode 51 to form a galvanic cell. The cells are each connected to impedance matching transformers 52 and 53. Resistors 54 and 55 are placed across the secondary windings of transformers 52 and 53, respectively. The voltage pulses developed across resistors 52 and 53 are fed to a differential amplifier 56. The noise, the source of which includes local power lines and ignition noise of nearby watercraft, is coherent, or in phase, for the two cells, and is cancelled by the circuit arrangement. The galvanic pulse developed by electrodes 21 and 51, when cutter blade electrode 21 strikes a conductor, is fed to transformer 53. This pulse is slightly reinforced by a galvanic pulse developed between electrodes 21 and 24, and produces an output from differential amplifier 56. The output of differential amplifier 56 is fed to an oscilloscope 57 and recorder amplifier 58 which is used to drive recorder 59. Although described as being particularly suitable for fresh water applications, the circuit of FIG. 4 is useable without modification in sea water.

Figure 5:
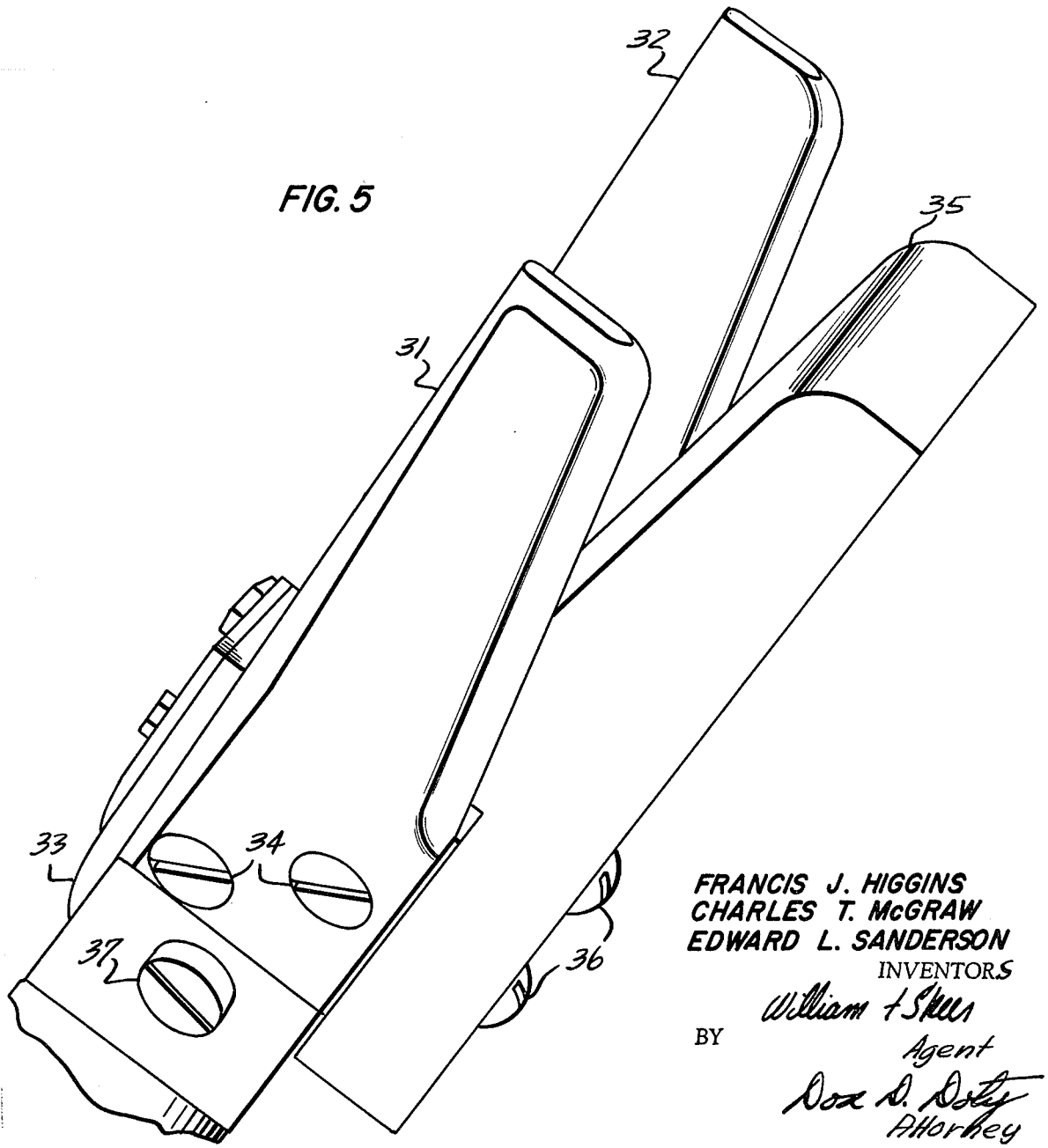
FIG. 5 shows an embodiment of a preferred form of the galvanic cell-cutter of the invention.

In actual practice, the reference galvanic cell may itself be a cutter assembly. The utilization of the reference cell as a cutter is practical, since it is contemplated that the cutter assembly 17 will have a plurality of cutter blades extending radially and spaced about the periphery of a central cylindrical center. In such a construction the reference electrodes for adjacent cells may be combined to form a single unitary electrode. FIG. 5 illustrates such an arrangement which has proven useful in testing and evaluation and, with suitable modifications, may be used as an operative portion of a cutter assembly. Blades 31 and 32 are each sharpened along their edge portions and mounted parallel to one another on an insulating carrier 33 by means of suitable threaded fasteners 34. The threaded fasteners 34 may serve as the terminals for blades 31, and a similar fastener, not shown, for blade 32, if threaded into internal connections, not shown, to which are joined suitable electrical conductors. A common electrode 35 is similarly secured to insulator carrier 33, spaced from and centered between blades 31 and 32, by means of suitable threaded fasteners 36, which, like fasteners 34, may be utilized as terminals for electrode 35. The blade shape and relative orientation may be changed to correspond to various operational parameters, as is obvious to persons skilled in the design and application of minesweeping gear. The device of FIG. 5 is constructed so as to be mounted on a pendulum arm, not shown, by means of threaded fasteners 37 for testing purposes. In actual practice blades 31 and 32 would be angularly divergent at an angle dependent upon the desired number of blades to be arranged about the blade assembly, rather than parallel as shown. Such an actual construction might appear, in section, as shown in FIG. 6.

Figure 6:
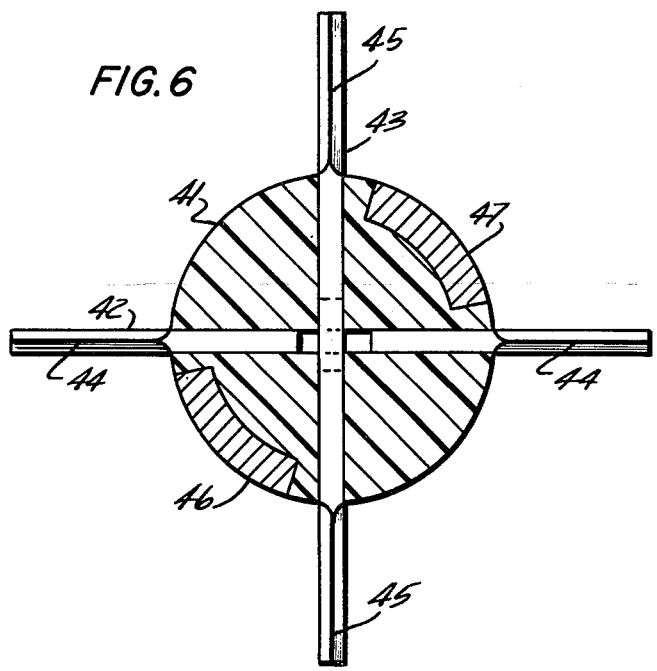
FIG. 6 illustrates a different embodiment of the galvanic cell-cutter according to the invention.

Referring to FIG. 6, a cylindrical body portion 41, made of electrically insulating material, supports, at right angles, two diametrically transverse metal blades 42 and 43. Suitable center construction permits the blades 42 and 43 to cross each other without electrical contact such that the protruding, sharpened edges 44 and 45, respectively, lie along a common, imaginary surface, such as a plane or shallow cone. Metal electrodes 46 and 47 are made of the same metal as blades 42 and 43 and mounted flush with the surface of body portion 41. By connecting a conductor to electrodes 46 and 47 and a conductor to each of blades 42 and 43, a three wire configuration of two separate galvanic cell pairs is formed. The cutter assembly may also have additional cell pairs located along its length. In instances when additional cell pairs are employed, the blades of the additional cell pairs may be angularly disposed in relation to blades 42 and 43. Such an arrangement improves the angular distribution of cutting edges. In such a construction the likelihood of both blades 42 and 43 simultaneously contacting the same conductor of a river mine command cable is extremely remote.

It has been found that the blades and reference electrodes may advantageously be made of type 304 stainless steel. Although some variations between samples have been noted, such a material can be expected to provide a low impedance pulse, of approximately fifty millivolts, when contacting a copper conductor. Successful coupling circuits have included high impedance amplifiers (e.g., Keithley Isolation Amplifiers) and, more effectively, impedance matching transformers (e.g., Triad G-4's). The apparatus and method of the invention produce satisfactory results in fresh water (e.g. with 0.35 parts of salt per thousand parts of water) as well as in water having 12.5 parts of salt per thousand parts of water, i.e., about 36% the salinity of sea water. The system has given positive indications with impact velocities of 17 feet per second, which corresponds to a towing speed of 10 knots, using No. 22 insulated copper wire and indications are that the system is useful, even with this small gage wire, up to 15 knots. Experienced personnel can, by observing a photograph taken from a cathode ray tube display of the cell output pulse, differentiate copper wires from "tin-cans" and other metallic debris on the bottom of the waterway. Audio monitors are also useful as indicators. Similar discrimination of pulse height to width may be performed by known circuitry which could make the utilization device incorporating such circuitry sensitive only to genuine strikes.

Figure 7:
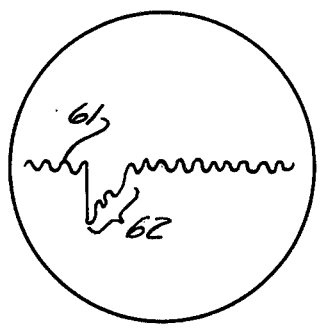
FIGS. 7 through 9 illustrate waveforms produced when the systems of FIGS. 2 through 4 encounter submerged electrical conductors.
Figure 8:
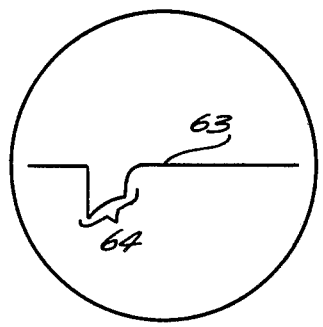
Figure 9:
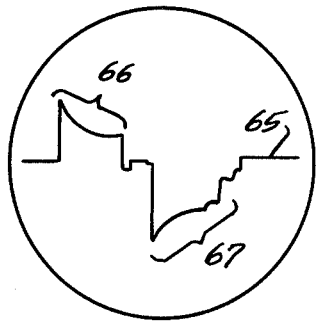

The polarity and magnitude of the produced pulse is determined by the type of metal from which the intercepted conductor is made. The pulse duration is determined by length of time the conductor is in contact with the blade. FIG. 7 illustrates a typical oscilloscope display produced by the system of FIG. 2. The trace 61 shows a sine wave noise output with a pulse 62 made by an insulated copper wire in fresh water. FIG. 8 shows the typical improvement afforded by the noise cancellation afforded by the circuit of FIG. 3. In FIG. 8 one sees that trace 63 is relatively free from noise and pulse 64 although of approximately the same magnitude of pulse 62 of FIG. 7 stands out in much sharper contrast because of the improved signal-to-noise ratio. The pattern of FIG. 9 is typical of the waveform produced by the system of FIG. 4 in striking a lead covered command cable. Trace 65 shows a pulse 66 corresponding to the lead covering of the wire and a pulse 67 corresponding to the copper center conductor or conductors.

In summary, the operation of the apparatus, as well as the practice of the method of Applicants' invention, follows the operation of the individual components as outlined above. A suitable tractor vehicle streams or places a galvanic cell-cutter assembly in a waterway believed to contain river mines. A sufficient length of tow line is played out to allow the cutter-cell assembly to be towed along bottom of the waterway parallel to the shoreline by the tractor vehicle. In the absence of a river mine command cable or other metallic contact, the output of the galvanic cell is a very low signal which may be further reduced by combining the output of similar cells placed in close proximity to said first cell, but connected in opposite polarity. When one of the cutter electrodes contacts a metal body, a low impedance voltage pulse is developed by the galvanic action of the cell. Depending upon the object, the salinity of the waterway and the tow speed, a pulse of a characteristic shape will be produced corresponding to the object struck. Such characteristically shaped pulses are utilized to indicate the presence of a probable command cable and activate such auxiliary equipment as desired. The location of the strike is then noted, investigated, and appropriate countermeasure steps are then taken, if necessary.

The operation of the device is relatively simple. The preferred cutter assembly is lightweight, employs no high voltages, and, hence, the method of the invention may be easily employed with a minimum of manpower. The device is reliable and is a considerable improvement over prior art methods and devices and offers a practical solution to a critical problem.

As previously discussed the apparatus of the present invention employs a reference electrode of the same metal as the cutting electrode. This choice is made to minimize the no-signal current because of the advantages realized by incorporating the particular coupling circuits and other associated operating parameters. Should the circumstances warrant, dissimilar metals, for example stainless steel and aluminum, could be employed with appropriate changes in the associated circuitry.

Obviously, other embodiments and modifications of the subject invention will readily come to the mind of one skilled in the art having the benefit of the teachings presented in the foregoing description and the drawings. It is, therefore, to be understood that this invention is not to be limited thereto and that said modifications and embodiments are intended to be included within the scope of the appended claims.

What is claimed is:

1. An apparatus for indicating the presence and cutting of an electrical wire located within an aqueous medium in contiguous disposition with the floor thereof, comprising:
   a cutting assembly, adapted for being towed by a predetermined tractor vehicle along the floor of said aqueous medium, having at least one sharpened metallic blade and at least one reference electrode of the same metallic material as said sharpened metallic blade disposed within said aqueous medium in close proximity therewith but electrically insulated therefrom;
   means connected to said cutting assembly for the towing thereof by said tractor vehicle, said towing means including a plurality of electrical conductors, one of which is electrically connected to said sharpened metallic blade, and another of which is connected to said one reference electrode; and
   means connected to said electrical conductors for utilizing the pulses of galvanic current which flows between said sharpened metallic blade and the aforesaid one reference electrode and within said electrical conductors as a result of the contact of said sharpened metallic blade with the aforesaid electrical wire.

2. An apparatus according to claim 1 in which said utilization means includes an amplifier connected to said metallic blade.

3. An apparatus according to claim 1 in which said utilization means includes an impedance matching transformer connected to said metallic blade.

4. An apparatus according to claim 1 in which said cutting assembly further includes a second electrode disposed in close proximity to said one sharpened metallic blade and said first electrode, with said second electrode being electrically connected to still another of said electrical conductors.

5. An apparatus according to claim 4 in which said second electrode is sharpened to form a second metallic blade.

6. An apparatus according to claim 5 in which said first and second metallic blades are located on opposite sides of said one reference electrode and co-act therewith to serve as a pair of galvanic cells.

7. An apparatus according to claim 6 in which the outputs of said pair of galvanic cells are connected to said utilization means in such a manner as to produce no output for simultaneous equal and opposite variations in the output of each of said pair of cells.

8. Apparatus according to claim 7 in which said utilization means includes an indicator to display a visual signal in response to an unbalanced output from said two galvanic cells.

9. A method of neutralizing river type marine mines and locating the command cables thereof, comprising the steps of:

streaming a cutter assembly having sharpened wire severing blades which are associated with other electrodes to constitute galvanic cells in a waterway containing said command cables;

playing out a predetermined amount of tow line attached to said cutter assembly to permit said cutter assembly to sink to the bottom of said waterway;

towing the cutter by said tow line along the bottom of said waterway to impact and thereby sever said command cable;

utilizing the galvanic voltage pulse resulting from impact of said cutter on said command cable to indicate the presence of said tow line; and recording the position of the cutter at the time of indication of said galvanic pulse to locate the point for subsequent investigation.

10. A method according to claim 9 in which said towing step comprises towing at velocities between 6 and 15 knots.

* * * * *